United States Patent [19]

Martiny

[11] Patent Number: 5,445,880
[45] Date of Patent: Aug. 29, 1995

[54] COVERING WITH IMPROVED OPTICAL QUALITIES

[76] Inventor: Frank Martiny, Mittlere Dorfstr. 2, D-8911, Eresing, Germany

[21] Appl. No.: 192,200

[22] Filed: Feb. 4, 1994

Related U.S. Application Data

[63] Continuation of Ser. No. 900,125, Jun. 18, 1992, abandoned.

[30] Foreign Application Priority Data

Jun. 24, 1991 [DE] Germany ................ 41 20 764.5

[51] Int. Cl.⁶ .................................. B32B 5/16
[52] U.S. Cl. .................... 428/323; 428/325; 524/914
[58] Field of Search ............. 106/711, 814; 428/323, 428/409, 410, 325, 228, 446; 524/914

[56] References Cited

U.S. PATENT DOCUMENTS

| | | | |
|---|---|---|---|
| 2,143,004 | 1/1939 | Greager et al. | 428/446 |
| 3,165,821 | 1/1965 | Bretoy | 428/409 |
| 4,088,808 | 5/1978 | Cornwell et al. | 428/409 |
| 4,098,755 | 7/1978 | Plunguian et al. | 428/409 |
| 4,241,126 | 12/1980 | Nicolas et al. | 428/174 |
| 4,320,164 | 3/1982 | Nicolas et al. | 428/47 |
| 4,328,276 | 5/1982 | Swarovski | 428/40 |
| 4,440,576 | 4/1984 | Flannery et al. | 106/814 |
| 4,526,920 | 7/1985 | Sakashita e tal. | 524/850 |
| 4,767,725 | 8/1988 | Mizutani et al. | 50/32 |

OTHER PUBLICATIONS

Derwent Synopsis No. 87-133348/19, H. Makiuchi, Sep. 28, 1985.

*Primary Examiner*—N. Edwards
*Attorney, Agent, or Firm*—Woodcock Washburn Kurtz Mackiewicz & Norris

[57] ABSTRACT

In a covering containing a binder and comprising a mixture of binder, aggregates, and additional decorative components, the additional decorative components consist of mirror-coated glass. By use of such mirror-coated glass, the covering is given excellent transparency and three-dimensionality.

4 Claims, 1 Drawing Sheet

U.S. Patent    Aug. 29, 1995    5,445,880
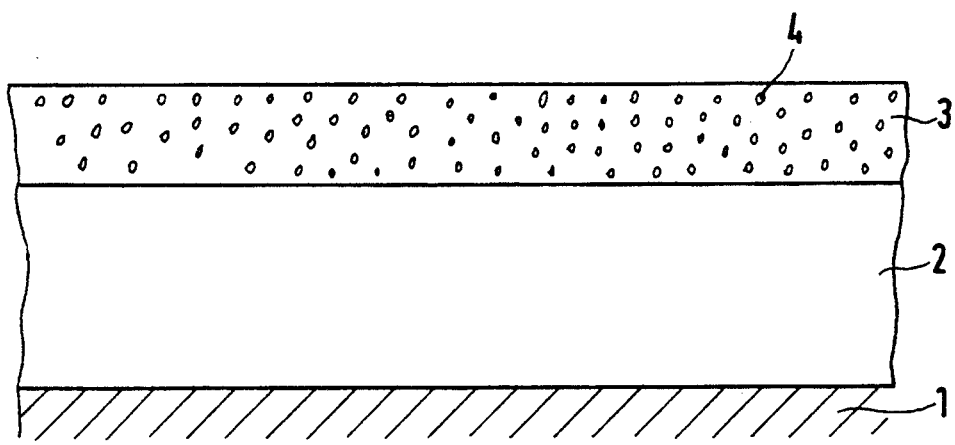

COVERING WITH IMPROVED OPTICAL QUALITIES

This is a continuation of application Ser. No. 07/900,125, filed Jun. 18, 1992, now abandoned.

BACKGROUND OF THE INVENTION

1. Field of the Invention

The invention relates to a covering containing a binder of a type used on floors, tiles and the like, comprising a mixture of binder, aggregates, and additional decorative components of glass.

2. Description of the Related Art

A covering containing a binder of a type used on floors, tiles and the like is known from Derwent synopsis 87-133348/19. The binder can, for example, consist of concrete, or cement, or e.g. of polyester resin.

In order to produce a covering known as TERRAZZO TM, which contains concrete, colored stone granules and powderized stone are added to a dry mixture of cement and aggregates. This mixture is then mixed with water. The resulting compound is then applied to a floor in the form of a layer and is then ground wet after it has set, resulting in a smooth continuous surface. Ready-made titles to be laid out for the formation of tiled surfaces can be produced in a similar way.

This covering, however, does not meet today's requirements for a covering which has a pleasant appearance, as its transparency is very low. For this reason, it is mainly used in areas where no high demands are made on the covering's attractiveness, e.g., in hospitals. Such aesthetic demand coverings are better met by the known coverings such as coverings comprising a mixture of binder, aggregates, and additional decorative components of glass, where the spread glass results in a certain transparency and plastic effect.

SUMMARY OF THE INVENTION

Using the prior art type of covering which contains concrete, an objective of this invention is to create a covering containing a binder having improved optical qualities.

Using this known prior art covering, this objective of this invention is solved by use of additional decorative components of mirror-coated glass. In other words, the decorative components consist of glass coated with a reflecting layer which does not remain visible itself after a grinding process but reflects the incident light back through glass. By use of these means, not only a glittering effect, but also a special three-dimensional effect is achieved.

The glass components used in this invention preferably consist of mirror-coated glass granules, fine mirror-coated glass grains, mirror-coated cullet, and/or mirror-coated glass powder.

A particularly beautiful effect is achieved when the glass components are colored or have a colored mirror coating. With regard to the three-dimensional effect, the best result is achieved when the glass components are mirror-coated by high-vacuum metallization. Additionally, the mixture can also contain metal components, e.g., brass or copper, which will reflect incident light. The covering's three-dimensionality is particularly enhanced when the covering's surface is ground and polished or glazed. As aggregates, sand, marble, granite, and/or sandstone are preferred.

For producing the covering containing a binder, a dry mixture comprising a binder, aggregates, and mirror-coated glass as an additional decorative component are mixed with water so as to create a kind of binder flooring. A layer is subsequently formed from this mixture, and the surface of this layer is machined after it has set.

The layer can be applied as a thin layer upon a thicker layer of binder on a floor, preferably a concrete floor. Thereby, the expenditure for the production can be reduced. Alternately, it can also be applied directly to the floor.

Using this method, continuous floors can be produced as well as floor tiles. However, the covering according to the invention can also be used as a covering for wash-basins, bathtubs, columns, etc.

BRIEF DESCRIPTION OF THE DRAWING

Further embodiments of the invention shall be described in the following by reference to the drawing.

FIG. 1 illustrates a covering of this invention containing a binder and mirror-coated glass granules, in cross-section.

DESCRIPTION OF THE PREFERRED EMBODIMENTS

Referring now to FIG. 1 layer 2 of binder flooring is applied onto a floor 1 using a known method. Another covering layer 3 comprising a mixture of 20 to 40% binder (not specifically shown), 20 to 40% aggregates (not specifically shown) 6 (granite or marble in the form of granules having a diameter of 0.3 to 1.5 mm), and 20 to 60% of glass granules 4, which have been mirror-coated by high-vacuum metallization or other equivalent process, is applied onto said layer 2. The thickness of the layer 3 is preferably 0.3 to 3.5 mm. As can be seen by reference to FIG. 1, the glass granules are smaller than the thickness of layer 3, and are mixed therethrough. The surface of the covering layer 3 is ground after setting and subsequently polished in order to achieve good transparency and three dimensionality, i.e., a three-dimensional appearance. Alternately, the surface may be glazed.

The glass components, which are preferred for use in this invention, are selected from the group of mirror-coated glass granules, fine mirror-coated glass grains, mirror-coated cullet, and/or mirror coated glass powder. Of course, mixtures of the above, and mixtures of mirror-coated glass components and metal components are within the scope of the invention.

What is claimed:

1. A floor covering comprising a mixture, the mixture including:
   binder;
   aggregates; and
   decorative components of mirror-coated glass.

2. The covering according to claim 1, wherein the decorative components are selected from the group consisting of mirror-coated glass granules, fine mirror-coated glass grains, mirror-coated cullet, and mirror-coated glass powder.

3. The covering according to claim 1, wherein the decorative components are selected from the group consisting of glass components which are colored and glass components having a colored mirror covering.

4. The covering according to claim 1, wherein the decorative components have a colored mirror coating.

* * * * *